(12) United States Patent
Bruder et al.

(10) Patent No.: US 7,440,598 B2
(45) Date of Patent: Oct. 21, 2008

(54) ADAPTIVE FILTER

(75) Inventors: Herbert Bruder, Hoechstadt (DE);
Thomas Flohr, Uehlfeld (DE); Otto Sembritzki, Wachenroth (DE); Karl Stierstorfer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 893 days.

(21) Appl. No.: 10/235,584

(22) Filed: Sep. 5, 2002

(65) Prior Publication Data

US 2003/0071220 A1    Apr. 17, 2003

(30) Foreign Application Priority Data

Sep. 5, 2001    (DE) ............................. 101 43 484

(51) Int. Cl.
*G06K 9/00* (2006.01)
*G06K 9/40* (2006.01)
*H04N 5/00* (2006.01)
*A61B 6/00* (2006.01)

(52) U.S. Cl. ............... 382/128; 382/260; 348/610; 378/4; 378/21

(58) Field of Classification Search ........... 382/161, 382/128–134, 260–265; 348/610; 378/4, 378/21
See application file for complete search history.

(56) References Cited

U.S. PATENT DOCUMENTS

| 4,009,960 | A | * | 3/1977 | Feldman et al. ............. 348/139 |
| 4,571,635 | A |   | 2/1986 | Mahmoodi et al. |
| 4,590,582 | A | * | 5/1986 | Umemura ................... 708/308 |
| 4,682,291 | A | * | 7/1987 | Reuveni ....................... 378/13 |
| 5,148,499 | A | * | 9/1992 | Matsumura ................. 382/131 |
| 5,432,716 | A | * | 7/1995 | Lebowsky et al. ........... 702/190 |
| 5,602,934 | A | * | 2/1997 | Li et al. ....................... 382/128 |
| 5,680,426 | A | * | 10/1997 | Ching-Ming ................... 378/8 |
| 5,953,461 | A | * | 9/1999 | Yamada ....................... 382/266 |
| 5,961,460 | A | * | 10/1999 | Guracar et al. .............. 600/440 |
| 6,069,979 | A | * | 5/2000 | VanMetter ................... 382/260 |
| 6,115,445 | A | * | 9/2000 | Lai ................................ 378/4 |
| 6,246,783 | B1 | * | 6/2001 | Avinash ....................... 382/128 |

FOREIGN PATENT DOCUMENTS

| DE |   | 4100262 A1 | * | 7/1991 |
| DE | OS 198 53 143 |   |   | 6/1999 |

OTHER PUBLICATIONS

Hou, H.S. Digital Document Processing. John Wiley & Sons: 1983.*

(Continued)

*Primary Examiner*—Bhavesh Mehta
*Assistant Examiner*—Manav Seth
(74) *Attorney, Agent, or Firm*—Schiff Hardin LLP

(57) ABSTRACT

In a method and filter and computer product for adaptive filtering of projection data acquired by a medical diagnostic apparatus, raw data-based filtering of the acquired projection data is undertaken using a filter with a filter kernel having a constant filter width, and the filtered projection data are mixed with the acquired projection data with a fixing of the respective quantitative relationships of filtered projection data to acquired projection data ensuing dependent on respective subsets of the acquired projection data.

45 Claims, 3 Drawing Sheets

OTHER PUBLICATIONS

Hsieh, Jiang. "Adaptive Trimmed Mean Filter for Computed Tomography Imaging": Jul. 1994. Proceedings of SPIE. vol. 2299. pp. 316-324.*

Souto, M., K.S. Malagari, D. Tucker, P.G. Tahoces, J. Correa, V.S. Bemakis, C. Roussos, K.A. Strigaris, J.J. Vidal, G.T. Barnes, and R.G. Fraser. "Digital Radiography of the Chest: State of the Art". European Radiology, vol. 4, pp. 281-297 (1994).*

Sivaramakrishna, Radhika, Nancy A. Obuchowski, William A. Chilcote, Gilda Cardenosa, na dKimerly A. Powell. "Comparing the Performance of Mammographic Enhancement Algorithms: A Preference Study". American Roentgen Ray Society, vol. 175, pp. 45-51 (Jul. 2000).*

Rogowska, Jadwiga, Kendall Preston, Jr., and Donald Sashin. "Evaluation of Digital Unsharp Masking and Local Contrast Stretching as Applied to Chest Radiographs". IEEE Transactions on Biomedical Engineering, vol. 35, No. 10, pp. 817-827 (Oct. 1988).*

"Digital Document Processing".

"Generalized Adaptive Median Filters and Their Application in Computed Tomography," Hsieh, Proc. Of SPIE, vol. 2298 (1994), pp. 662-672.

"Adaptive Trimmed Mean Filter For Computed Tomography Imaging," Hsieh, Proc. Of SPIE, vol. 2299 (1994), pp. 316,324.

"Adaptive Filtering Approach to the Streaking Artifact Reduction Due to X-ray Photon Starvation," Hsieh, Radiology vol. 205 (P), (1997), p. 391.

* cited by examiner

ADAPTIVE FILTER

BACKGROUND OF THE INVENTION

1. Field of the Invention

The present invention is directed to a method, apparatus and computer program product for adaptive filtering of projection data acquired by means of a medical diagnosis apparatus.

2. Description of the Prior Art

Projection data of an examined measurement subject can be acquired with modern medical diagnosis methods such as, for example, computed tomography. Generally, the examined measurement subject is a patient.

The acquired projection data usually are in digital form and are thus accessible to digital data processing. A digitization is initially needed, given analog projection data.

Possible operations of the digital data processing are, for example, an amplification, overlaying or filtering.

Since a number of manipulated variables can enter into the acquired projection data dependent on the measurement method and the diagnostic apparatus employed, the acquired projection data can comprise a plurality of dimensions.

In modern computed tomography (CT), the parameter l in the measured data S (l, k, z) indicates the projection angle (the angular position of the tube or, angular position of tube and detector system), k indicates the channel index (corresponding to the angle in the fan, given fan geometry and corresponding to the distance of the beam from the rotational center in parallel geometry), and z indicates the slice.

These acquired projection data (slice dataset) are then reconstructed with a reconstruction method for planar data (usually filtered back-projection or Fourier reconstruction) in order to obtain the desired CT image.

In practically all medical diagnostic devices the image quality with reference to noise and low-contrast perceptibility increases monotonously with the patient dose. For improving the image quality, thus, an increase in the dose stress on the patient is generally required. Such an increase in, the patient dose is possible only to a limited extent in order to avoid secondary harm.

Digital data processing offers an alternative possibility for reducing the pixel noise. For example, smoothing reconstruction filters can be freely selected within certain limits without significant technical outlay in any commercially available CT apparatus, so that the noise level in the image can be lowered by means of smoothing filtering without increasing the patient dose.

A disadvantage of smoothing reconstruction filters, however, is that the entire dataset is smoothed with this method. This necessarily leads to a degradation of the spatial resolution.

Approaches for adaptive filtering of the measured data are found in the literature for solving this problem, i.e. the dataset is not globally smoothed, but only locally smoothed (Jiang, "Adaptive trimmed mean for computer tomography image reconstruction, Proc. of SPIE, 2299, pp. 316-324, 1994; Jiang, "Adaptive filtering approach to the streaking artifact reduction due to x-ray photon starvation", Radiology 205 (P), p. 391, 1997; Berkman Sahiner and Andrew E. Yagle, "Reconstruction from projections under timefrequency constraints", IEEE Transactions on Medical Imaging, 14(2), pp. 193-204, 1995).

Usually, the acquired projection data of detector elements neighboring in the k-direction are employed for the adaptive filtering. The filtering thus occurs exclusively in the l-direction.

German PS 198 53 143 also discloses a computed tomography apparatus wherein the noise level of the interpolated projections does not exceed a specific threshold by means of 3D adaptive filtering both in the channel-direction ($\xi$-coordinate), in projection direction (v-coordinate) as well as in the table feed direction (z-coordinate) according to the equation $$\rho_{AF}(\xi,v,z) = \int d\xi' dv' dz' \int \Delta\xi(\xi-\xi') \int \Delta v(v-v') \int \Delta z(z-z') \rho_x(\xi',v',z') \cdot \rho_x(\xi,v,z)$$

denotes the projection data in parallel or fan geometry available before the implementation of the adaptive filtering, $P_{AF}$ ($\xi$,v,z) denotes the projection data in parallel or fan geometry available after the implementation of the adaptive filtering, and $\Delta\xi$, $\Delta v$, $\Delta z$ denote the filter widths in the three coordinate directions.

These filter widths are a function of the projection value $\rho_x(\xi, v, z)$ (adaptive filtering) to be currently filtered: $\Delta\xi=\Delta\xi$ ($\rho_x(\xi, v, z)$), $\Delta v=\Delta v(\rho_x(\xi, v, z))$ and $\Delta z=\Delta z(\rho_x(\xi,v, z))$. $f\Delta\xi(\cdot)$, $f\Delta v(\cdot)$ and $f\Delta z(\cdot)$ reference the filter function (axially symmetrical with values $\geq 0$ and total area 1) for the smoothing in the respective coordinates. The filter widths $\Delta\xi$, $\Delta v$, and $\Delta z$ respectively represent the half intensity widths or some other characteristic width criterion of the filter functions. When one or more of the widths is/are zero, then the filter function is reduced to a Dirac delta function and no filtering occurs in the corresponding coordinates.

German PS 198 53 143 thus discloses a method for filtering multi-dimensional planar projection data (attenuation values) of a CT scan wherein the adaptation of the filter to the projection data under consideration ensues by variation of the width of the filter kernel (filter width) in the individual dimensions.

A disadvantage of this known method is that the implementation of the method requires considerable computing and time expenditure due to the adaptively fluctuating filter width in the individual dimensions.

SUMMARY OF THE INVENTION

An object of the present invention is to provide a method for adaptive filtering of projection data acquired by means of a medical diagnostic apparatus wherein noise in the acquired projection data can be designationally reduced with only little computing outlay, and to provide a computed tomography apparatus operating according to the method.

This object is achieved according to the invention in a method for adaptive filtering of projection data acquired by a medical diagnostic apparatus, and a medical apparatus for implementing the method, wherein raw data-based filtering of the acquired projection data is undertaken using a filter with a filter kernel having a constant filter width, and the filtered projection data are mixed with the acquired projection data, with a fixing of the respective quantitative relationships of the filtered projection data to the acquired projection data ensuing dependent on at least a subset of the acquired projection data.

Since the filter width of the filter kernel is constant in the invention, the method can be implemented without high calculating outlay. The time required for an adaptive filtering of the projection data acquired by means of a medical diagnostic apparatus thus can be reduced. Also contributing to this is that the mixing function for mixing the filtered measured data with the unfiltered measured data is one-dimensional, i.e. the same for all dimensions.

As used herein "raw data-based filtering" means that the actual projection data are filtered before the reconstruction of an image has occurred. Accordingly, the projection data in the form of raw data do not yet represent an image. In order to be able to display an image, an image reconstruction must first occur, for example on the basis of the standard method of convoluted back-projection.

In a preferred embodiment, the projection data have two or more dimensions, and the filtering of the projection data ensues in all dimensions with a filter having a two-dimensional or multi-dimensional filter kernel, with the filter width in each individual dimension being constant.

Due to the two or more-dimensional design of the filter kernel, it is possible—given a constant filter width—to increase the quantum averaging and to thus reduce the noise further.

The mixing of the filtered projection data with the unfiltered projection data can ensue especially simply when respective adaptation factors dependent on at least a subset of the acquired projection data are defined for the acquired projection data and for the filtered projection data, and the respective quantitative relationships of filtered projection data to acquired projection data in the mixing are fixed by the respective adaptation factors.

For simplifying the inventive method, it can be advantageous when either the adaptation factor for the acquired projection data or the adaptation factor for the filtered projection data is equal to one.

In another preferred embodiment of the inventive method, a threshold for the acquired projection data is defined in an additional step, and at least one adaptation factor is defined dependent on a difference between the acquired projection data and the threshold.

Using the adaptation factor defined in this way, it is possible in an especially simple way to except areas of the acquired projection data from the adaptive filtering by means of a suitable selection of the threshold.

This can ensue, for example, by setting the respective adaptation factor for the acquired projection data equal to one and setting the respective adaptation factor for the filtered projection data equal to zero when the difference between acquired projection data and threshold is less than or equal to zero.

In another embodiment of the inventive method, the adaptation factor for the filtered projection data is determined dependent on a difference between the acquired projection data and the threshold, and the adaptation factor for the acquired projection data is defined by the difference between one and the adaptation factor for the filtered projection data when the difference between acquired projection data and threshold is greater than zero.

As a result of this procedure, the adaptation factor for the filtered projection data and the adaptation factor for the unfiltered, acquired projection data always supplement one another to form the value of one, which generally corresponds to 100%. This allows an especially simple controllability of the inventive method.

The filter for projection data with three dimensions according to a first preferred embodiment of the present invention, has the form $$S_{af}(l, k, m) = g(S) \cdot S_f(l, k, m) + h(S) \cdot S(l, k, m).$$

The variables l, k, m are the dimensions of the projection data, S(l, k, m) is the unfiltered three-dimensional projection data, g(S), h(S) are adaptation factors dependent on the respective projection data to be filtered, $S_f(l, k, m)$ is the projection data filtered with a filter having three-dimensional filter kernel, and $S_{af}(l, k, m)$ is the adaptively filtered projection data, as the output quantity of the filter.

According to a second preferred embodiment of the inventive method, the filter for projection data with three dimensions has the form $$S_{af}(l, k, m) = S(l, k, m) \text{ for } S(l, k, m) - SW \leq 0$$

and $$S_{af}(l, k, m) = A(S-SW) \cdot S_f(l, k, m) + (1-A(S-SW)) \cdot S(l, k, m) \text{ for } S(l, k, m) - SW > 0.$$

The variables l, k, m are the dimensions of the projection data, S(l, k, m) is the unfiltered three-dimensional projection data, SW is an adjustable threshold, A(S−SW) is an adaptive adaptation factor, i.e. an adaptation factor dependent on the respective projection data to be filtered, $S_f(l, k, m)$ is the projection data filtered with a filter having three-dimensional filter kernel, and $S_{af}(l, k, m)$ is the adaptively filtered projection data as output quantity of the filter. A(S−SW) becomes greater the more highly the projection data S(l, k, m) exceed the threshold SW.

It is especially advantageous when the adaptation factor is selected such that the signal noise of a signal voltage of the adaptively filtered projection data remains constant independently of the acquired projection data.

The projection data filtered with a filter having a multi-dimensional filter kernel preferably are presented according to the present invention in the form $$S_f(l, k, m) = \sum_{k',m'} G_{l',k',m'} \cdot S_{l-l',k-k',m-m'},$$

wherein $G_{l',k',m'}$ is the filter kernel and $S_{l-l',k-k',m-m'}$ references the unfiltered projection data.

The inventive method can be especially advantageously utilized when the attenuation values of a computer tomograph are employed as the projection data.

An apparatus for the implementation of the inventive method has a filter with a filter kernel having a constant filter width that is suitable for raw data-based filtering of the acquired projection, and a mixer device for mixing the filtered projection data with the acquired projection data, the mixer device being suitable for implementing a definition of the respective quantitative relationships of the filtered projection data to the acquired projection data dependent on at least a subset of the acquired projection data.

The present invention is also directed to a computer program product that is suitable for implementing a method as described above when loaded in a memory of a processing device.

DESCRIPTION OF THE PREFERRED EMBODIMENTS

Figure 1:
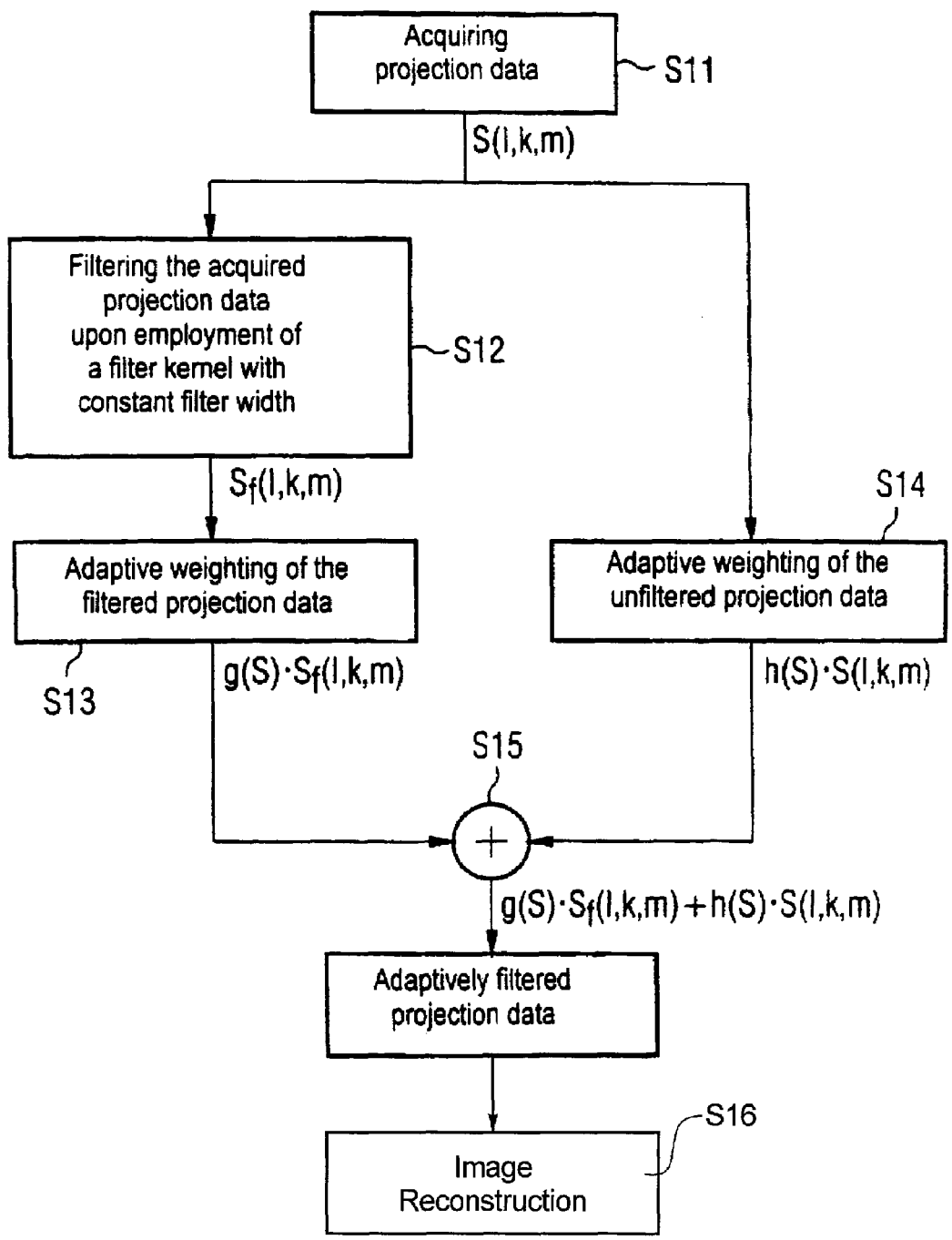
FIG. 1 schematically illustrates the sequence of the inventive method in a first embodiment.

The inventive apparatus shown in FIG. 3 suitable for the implementation of the inventive method shall be described below first.

The inventive apparatus 5 for the implementation of the inventive method is connected to a medical device 1, for example a computed tomography apparatus, and has a filter 2 with a filter kernel of constant filter width that is suited for raw data-based filtering of the acquired projection data.

The filtering ensues for the purpose of reducing a pixel noise that is always present because of noise quantities in the acquired projection data. Since the acquired projection data are filtered overall, the desired reduction of the pixel noise is accompanied, however, by a disadvantageous, degraded spatial resolution in the filtered projection data.

The filter 2 is connected to a mixer device 3 that is likewise part of the inventive apparatus 5.

The mixer device 3 is suited for mixing the filtered projection data with the acquired projection data, with a definition of the respective, quantitative relationships of filtered projection data to acquired projection data ensuing dependent on the respective subset of acquired projection data under consideration, i.e. adaptively.

Adaptively filtered projection data are thus made available at the output of the mixer device 3.

The result of this adaptive mixing of the filtered projection data to the acquired, i.e. unfiltered projection data for the purpose of generating adaptively filtered projection data is that the pixel noise in the projection data can be designationally reduced without having to accept a global degradation of the spatial resolution.

The reduction of the pixel noise thus can be attributed to the proportion of filtered projection data, and the retention of the topical resolution can be attributed to the proportion of acquired projection data.

The weighting of filtered projection data to acquired projection data is therefore set dependent on a subset of the acquired projection data so that an adequate reduction of the pixel noise is achieved in the adaptively filtered projection data, but with retention of an adequate spatial resolution.

An image reconstructed in an image reconstrution computer 6 from the adaptively filtered projection data acquired in this way can be supplied as an output to a user, usually a physician, in the form of a CT image via an output device 4.

Figure 3:
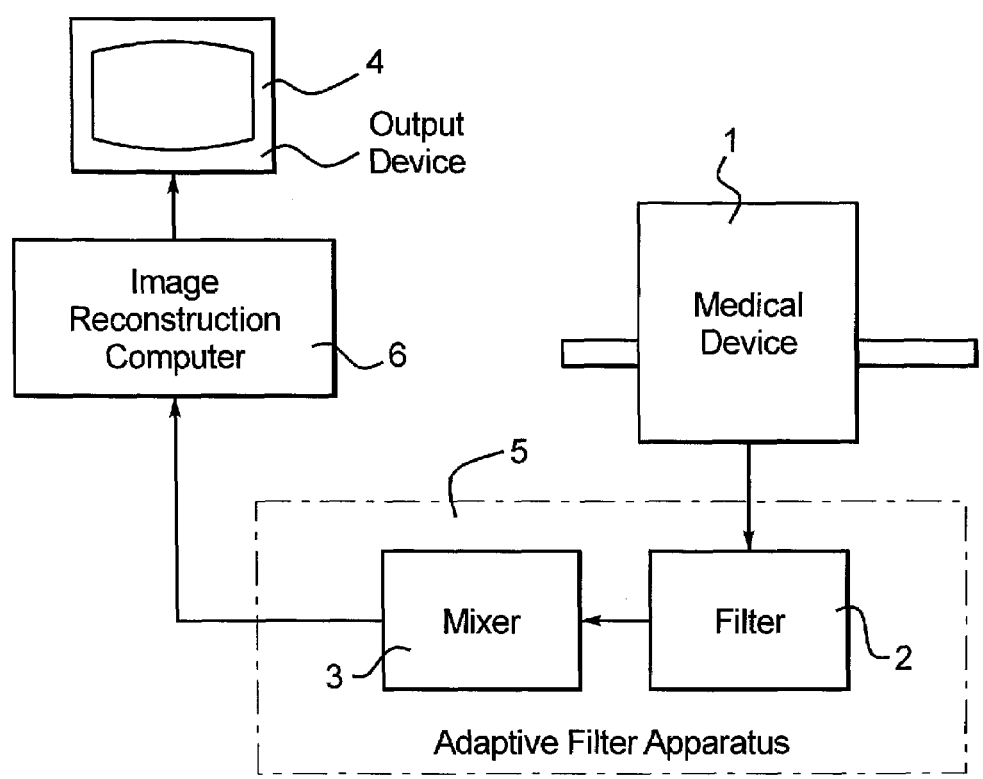
FIG. 3 illustrates an apparatus that is suitable for the implementation of the inventive method.

Alternatively to the embodiment shown in FIG. 3, it should be noted that the filter 2 and the mixer device 3 can form a fixed unit. For example, it would be possible to realize the filter 2 as well as the mixer device 3 in a computer chip (not shown).

FIG. 1 schematically shows the sequence of the inventive method according to a first preferred embodiment as can be realized, for example, in the above-described, inventive apparatus 5.

In this first preferred embodiment, projection data $S(l, k, m)$ are acquired with the medical device 1 in a first step S11. Alternatively, the projection data $S(l, k, m)$ can have already been obtained and stored in a memory device (not shown) and read out therefrom in step S11.

These acquired projection data $S(l, k, m)$ can, for example, be the attenuation values of a computed tomography apparatus.

In the embodiment shown in FIG. 1, the projection data have three dimensions l, k, m. Alternatively, however, the employment of n-dimensional projection data is generally possible (with $n \geq 1$).

In step S12, the acquired projection data $S(l, k, m)$ are filtered in the filter 2 using a filter kernel having a constant filter width. Since the projection data $S(l, k, m)$ in the embodiment shown in FIG. 1 have three dimensions l, k, m, the filtering also ensues with a three-dimensional filter kernel in all dimensions l, k, m, with the filter width being constant in each of the individual dimensions l, k m.

Due to the three-dimensional design of the filter kernel and compared to a one-dimensional design of the filter kernel that is likewise inventively possible, the quantum averaging is increased given a constant filter width, and thus noise in each dimension of the projection data is designationally reduced further.

Given n-dimensional projection data, thus, the filtering generally ensues in all n dimensions with a filter having an n-dimensional filter kernel, with the respective filter widths in the individual dimensions being constant.

Filtered projection data $S_f(l, k, m)$ are obtained as output signal of step S12.

In the steps S13 and S14, which are parallel to one another, the acquired projection data $S_f(l, k, m)$ are respectively weighted with an adaptation factor $g(S)$ and $h(S)$. This weighting can ensue with a weighting device (not shown) that can be part of the inventive apparatus 5. The weighting device preferably is integrated into the mixer device 3.

The weighting preferably ensues in each dimension l, k, m and dependent on at least one subset of the acquired projection data $S(l, k, m)$, i.e. adaptively. Adaptation factors are thereby one-dimensional, i.e. the same for each dimension.

Alternatively, it is also possible to define only one adaptation factor and set the other adaptation factor equal to one.

In the following step S15, the filtered projection data $S_f(l, k, m)$ are mixed with the acquired projection data $S(l, k, m)$ by the mixer device 3. Due to the adaptive weighting of the filtered projection data $S_f(l, k, m)$ and the unfiltered projection data $S(l, k, m)$ with the adaptation factors $g(S)$, $h(S)$, the definition of the respective quantitative relationship of filtered projection data $S_f(l, k, m)$ to unfiltered projection data $S(l, k, m)$ also ensues adaptively, i.e. dependent on respective subsets of the acquired projection data $S(l, k, m)$. The result of the mixing step S15 is adaptively filtered projection data, which are used to reconstruct an image in step S16.

In the first embodiment, the acquired, adaptively filtered projection data $S_{af}(l, k, m)$ thus can be written in the form $$S_{af}(l, k, m) = g(S) \cdot S_f(l, k, m) + h(S) \cdot S(l, k, m).$$

With the inventive method and also without employing a filter with adaptive filter width, it is consequently possible to designationally reduce the noise in a respective dimension of the projection data while avoiding an increased computing time expenditure.

Figure 2:
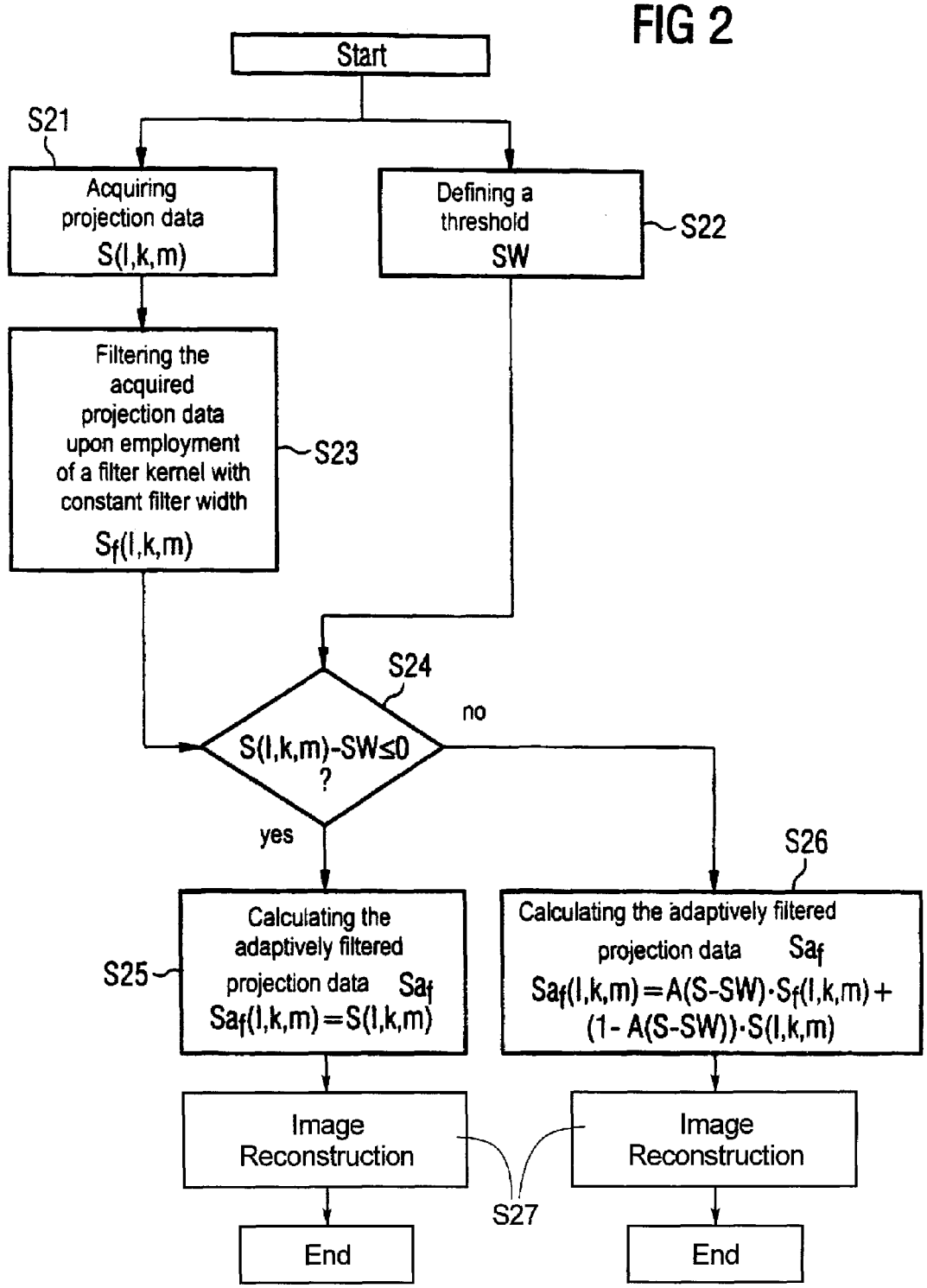
FIG. 2 schematically illustrates the sequence of the inventive method in a second embodiment.

In the embodiment of FIG. 2, analogous to the above-described, first embodiment, projection data $S(l, k, m)$ are also acquired first in step S21 by the medical device 1, said projection data $S(l, k, m)$ being filtered in a further step S23 upon employment of a filter 2 with a filter kernel having a constant filter width in order to obtain filtered projection data $S_f(l, k, m)$.

Parallel thereto, a threshold SW for the acquired projection data $S(l, k, m)$ is defined in step S22 in a threshold-setting device (not shown in FIG. 3) that can be part of the inventive apparatus 5.

In step S24, a check is carried out a testing device (not shown in FIG. 3) to determine whether the difference of the acquired projection data $S(l, k, m)$ minus the threshold SW is less than or equal to "0": $S(l, k, m) - SW \leq 0$. The testing device also can be part of the inventive apparatus 5, whereby it is preferably integrated into the mixer device 3 and is connected to the threshold-setting device.

When step S24 supplies the value "true" ("yes") as result, then the filtered projection data $S_f(l, k, m)$ are weighted with "0" in the mixer device (the adaptation factor for the filtered projection data is "0") and thus do not enter into the final result. The acquired projection data S(l, k, m), in contrast, are weighted with "1" according to this embodiment.

Consequently, the adaptively filtered projection data $S_{af}$ at the output of the mixer device 3 derive as $S_{af}(l, k, m)=S(l, k, m)$ for $S(l, k, m)-SW \leqq 0$ according to this embodiment.

When the step S24 supplies the value "false" (no") as result, then the filtered projection data $S_f(l, k, m)$ are weighted by the mixer device 3 dependent on a difference between the acquired projection data S(l, k, m) and the threshold SW. The adaptation factor for the filtered projection data $S_f(l, k, m)$ can thus be written in the form A(S−SW). A(S−SW) thereby increases the more highly the projection data S exceed the threshold SW.

At the same time, the acquired projection data S(l, k, m) are weighted such by the mixer device 3 that the sum of the weighting of the filtered projection data $S_f(l, k, m)$ and the weighting of the unfiltered projection data S(l, m, k) yields 1 or 100%.

The adaptation factor for the acquired projection data can thus be presented in the form 1−A(S−SW).

Consequently, the adaptively filtered projection data $S_{af}$ at the output of the mixer device derive as $$S_{af}(l, k, m)=A(S-SW) \cdot S_f(l, k, m)+(1-A(S-SW)) \cdot S(l, k, m)$$

for S(l, k, m)−SW>0 according to this embodiment.

Image reconstruction then takes place in step S27.

Without employing a filter with adaptive filter width, the second embodiment of the inventive method described in the above example also makes it possible to designationally reduce the noise in the projection data while avoiding an increased calculating time expenditure.

According to another, preferred embodiment of the present invention, the inventive method is implemented in a computer program product that can be loaded into a processing device (for example, a computer or the above-described apparatus 5 of the invention) for the implementation of the inventive method.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method including adaptively filtering raw projection data acquired by a medical diagnostic apparatus, comprising the steps of:

filtering said acquired raw projection data, to obtain filtered raw projection data, by supplying the raw projection data directly to a filter having a filter kernel with a constant filter width and filtering said raw projection data only in said filter, and preserving said acquired raw projection data as unfiltered raw projection data; and mixing said filtered raw projection data with said unfiltered raw projection data, with respective quantitative relationships of the filtered raw projection data to the unfiltered raw projection data, and fixing said respective quantitative relationships dependent on at least a subset of said unfiltered raw projection data, to produce adaptively filtered projection data.

2. A method as claimed in claim 1 wherein said acquired raw projection data have at least two dimensions, and wherein the step of filtering said acquired raw projection data comprises filtering said acquired raw projection data in all of said dimensions with a filter having an at least two-dimensional filter kernel, with a filter width in each of said at least two dimensions being constant.

3. A method as claimed in claim 1 comprising defining respective adaptation factors for said unfiltered raw projection data and said filtered raw projection data dependent on said subset, and fixing said respective quantitative relationships dependent on the respective adaptation factors.

4. A method as claimed in claim 3 comprising setting the adaptation factor for the unfiltered raw projection data or the adaptation factor for the filtered raw projection data equal to one.

5. A method as claimed in claim 4 comprising the additional step of defining a threshold for said unfiltered raw projection data, and setting at least one of said respective adaptation factors dependent on a difference between said unfiltered raw projection data and said threshold.

6. A method as claimed in claim 5 comprising setting the respective adaptation factor for said unfiltered raw projection data equal to one, and setting the respective adaptation factor for the filtered raw projection data equal to zero when said difference between said unfiltered raw projection data and said threshold is less than or equal to zero.

7. A method as claimed in claim 6 comprising setting the respective adaptation filter for said filtered raw projection data dependent on said difference between said unfiltered raw projection and said threshold and setting the adaptation factor for the unfiltered raw projection data as a difference between one and said adaptation factor for the filtered raw projection data, when said difference between said unfiltered raw projection data and said threshold is greater than zero.

8. A method as claimed in claim 3 wherein said acquired raw projection data have three dimensions, and filtering said acquired raw projection data with a filter having a form $$S_{af}(l, k, m)=g(S) \cdot S_f(l, k, m)+h(S) \cdot S(l, k, m),$$

wherein l, k, m denote the dimensions of the acquired raw projection data,

S(l, k, m) denotes the unfiltered raw three-dimensional projection data, g(S), h(S) denotes adaptation factors dependent on the respective acquired raw projection data to be filtered, $S_f(l, k, m)$ denotes the raw projection data filtered with a filter having three-dimensional filter kernel, and $S_f(l, k, m)$ denotes the adaptively filtered raw projection data as output quantity of the filter.

9. A method as claimed in claim 8 comprising setting said adaptation factor so that a signal noise of a signal voltage of said filtered raw projection data $S_{af}(l,k,m)$ remains constant independently of said unfiltered raw projection data S(l,k,m).

10. A method as claimed in claim 8 wherein said projection raw data filtered with said filter having said three-dimensional filter kernel have a form $$S_f(l, k, m) = \sum_{k',m'} G_{l',k',m'} \cdot S_{l-l',k-k',m-m'},$$

wherein $G_{l',k',m'}$ denotes the filter kernel and $S_{l-l',k-k',m-m'}$ references the unfiltered raw projection data.

11. A method as claimed in claim 3 wherein said acquired raw projection data have three dimensions, and comprising the additional steps of defining a threshold for said unfiltered raw projection data, defining an adaptation factor dependent on a difference between the unfiltered raw projection data and said threshold, and filtering said acquired three-dimensional raw projection data in a filter having a three-dimensional filter kernel with a form $$S_{af}(l, k, m) = S(l, k, m) \text{ for } S(l, k, m) - SW \leq 0$$

and $$S_{af}(l, k, m) = A(S-SW) \cdot S_f(l, k, m) + (1-A(S-SW)) \cdot S(l, k, m) \text{ for } S(l, k, m) - SW > 0$$

wherein
- l, k, m denote the dimensions of the acquired raw projection data,
- S(l, k, m) denotes the unfiltered three-dimensional raw projection data,
- SW denotes an adjustable threshold,
- A(S−SW) denotes said adaptation factor,
- $S_f$(l, k, m) denotes the raw projection data filtered with said filter having a three-dimensional filter kernel, and
- $S_{af}$(l, k, m) denotes the adaptively filtered raw projection data as an output quantity of the filter.

12. A method as claimed in claim 11 comprising setting said adaptation factor so that a signal noise of a signal voltage of said filtered raw projection data $S_{af}$(l,k,m) remains constant independently of said unfiltered raw projection data S(l,k,m).

13. A method as claimed in claim 11 wherein said acquired raw projection data filtered with said filter having said three-dimensional filter kernel have a form $$S_f(l, k, m) = \sum_{k',m'} G_{l',k',m'} \cdot S_{l-l',k-k',m-m'},$$

wherein $G_{l',k',m'}$ denotes the filter kernel and $S_{l-l',k-k',m-m'}$ references the unfiltered projection data.

14. A method as claimed in claim 1 comprising employing attenuation values obtained in a computed tomography apparatus as said acquired raw projection data.

15. An apparatus that adaptively filters raw projection data acquired by a medical diagnostic apparatus, comprising;
- an input for receiving raw projection data acquired by a medical diagnostic apparatus;
- a filter connected directly to said input that filters said acquired raw projection data, to obtain filtered raw projection data, said filter having a filter kernel with a constant filter width and being the only filter that filters said raw projection data; and
- a mixer connected to an output of said filter and to said input for mixing said filtered raw projection data with said acquired raw projection data, as unfiltered raw projection data, with respective quantitative relationships of the filtered raw projection data to the unfiltered projection data, and fixing said respective quantitative relationships dependent on at least a subset of said unfiltered raw projection data, to produce adaptively filtered raw projection data at an output of said mixer.

16. An apparatus method as claimed in claim 15 wherein said acquired raw projection data have at least two dimensions, and wherein said filter filters said acquired raw projection data in all of said dimensions with an at least two-dimensional filter kernel, with a filter width in each of said at least two dimensions being constant.

17. An apparatus as claimed in claim 15 wherein said mixer defines respective adaptation factors for said unfiltered raw projection data and said filtered raw projection data dependent on said subset, and fixes said respective quantitative relationships dependent on the respective adaptation factors.

18. An apparatus as claimed in claim 17 wherein said mixer sets the adaptation factor for the unfiltered raw projection data or the adaptation factor for the filtered raw projection data equal to one.

19. An apparatus as claimed in claim 17 wherein said mixer defines a threshold for said unfiltered raw projection data, and sets at least one of said respective adaptation factors dependent on a difference between said unfiltered raw projection data and said threshold.

20. An apparatus as claimed in claim 19 wherein said mixer sets the respective adaptation factor for said unfiltered raw projection data equal to one, and sets the respective adaptation factor for the filtered raw projection data equal to zero when said difference between said unfiltered raw projection data and said threshold is less than or equal to zero.

21. An apparatus as claimed in claim 19 wherein said mixer sets the respective adaptation filter for said filtered raw projection data dependent on said difference between said unfiltered raw projection and said threshold and sets the adaptation factor for the unfiltered raw projection data as a difference between one and said adaptation factor for the filtered raw projection data, when said difference between said unfiltered raw projection data and said threshold is greater than zero.

22. An apparatus as claimed in claim 17 wherein said acquired raw projection data have three dimensions, and wherein said filter has a form $$S_{af}(l, k, m) = g(S) \cdot S_f(l, k, m) + h(S) \cdot S(l, k, m),$$

wherein
- l, k, m denote the dimensions of the acquired raw projection data,
- S(l, k, m) denotes the unfiltered three-dimensional projection data,
- g(S), h(S) denotes adaptation factors dependent on the respective raw projection data to be filtered,
- $S_f$(l, k, m) denotes the raw projection data filtered with a filter having three-dimensional filter kernel, and $S_{af}$(l, k, m) denotes the adaptively filtered raw projection data as output quantity of the filter.

23. An apparatus as claimed in claim 22 wherein said mixer sets said adaptation factor so that a signal noise of a signal voltage of said filtered raw projection data $S_{af}$(l,k,m) remains constant independently of said unfiltered raw projection data S(l,k,m).

24. An apparatus as claimed in claim 22 wherein said raw projection data filtered with said filter having said three-dimensional filter kernel have a form $$S_f(l, k, m) = \sum_{k',m'} G_{l',k',m'} \cdot S_{l-l',k-k',m-m'},$$

wherein $G_{l',k',m'}$ denotes the filter kernel and $S_{l-l',k-k',m-m'}$ references the unfiltered raw projection data.

25. An apparatus as claimed in claim 17 wherein said acquired raw projection data have three dimensions, and wherein said mixer defines a threshold for said unfiltered raw projection data, defines an adaptation factor dependent on a difference between the unfiltered raw projection data and said threshold, and wherein said filter has a three-dimensional filter kernel with a form $$S_{af}(l, k, m) = S(l, k, m) \text{ for } S(l, k, m) - SW \leq 0$$

and $S_{af}(l, k, m)=A(S-SW) \cdot S_f(l, k, m)+(1-A(S-SW)) \cdot S(l, k, m)$ for $S(l, k, m)-SW>0$ wherein l, k, m denote the dimensions of the acquired raw projection data, S(l, k, m) denotes the unfiltered three-dimensional raw projection data, SW denotes an adjustable threshold, A(S−SW) denotes said adaptation factor, $S_f(l, k, m)$ denotes the raw projection data filtered with said filter having a three-dimensional filter kernel, and $S_{af}(l, k, m)$ denotes the adaptively filtered raw projection data as an output quantity of the filter.

26. An apparatus as claimed in claim 25 wherein said mixer sets said adaptation factor so that a signal noise of a signal voltage of said filtered raw projection data $S_{af}(l,k,m)$ remains constant independently of said unfiltered raw projection data S(l,k,m).

27. An apparatus as claimed in claim 25 wherein said raw projection data filtered with said filter having said three-dimensional filter kernel have a form $$S_f(l, k, m) = \sum_{k',m'} G_{l',k',m'} \cdot S_{l-l',k-k',m-m'},$$

wherein $G_{l',k',m'}$ denotes the filter kernel and $S_{l-l',k-k',m-m'}$ references the unfiltered raw projection data.

28. An apparatus as claimed in claim 15 wherein said input receives attenuation values obtained in a computed tomography apparatus as said acquired raw projection data.

29. A computer readable medium encoded with a data structure and loadable into a processor to adaptively filter raw projection data acquired by a medical diagnostic apparatus, said data structure causing said processor to:

filter said acquired raw projection data, to obtain filtered projection data, only in a filter having a filter kernel with a constant filter width, and preserve said acquired raw projection data as unfiltered raw projection data; and mix said filtered raw projection data with said unfiltered raw projection data, with respective quantitative relationships of the filtered raw projection data to the unfiltered raw projection data, and fixing said respective quantitative relationships dependent on at least a subset of said unfiltered raw projection data, to produce adaptively filtered projection data.

30. A computer-readable medium encoded with a data structure as claimed in claim 29 wherein said acquired raw projection data have at least two dimensions, and which causes said processor to filter said raw projection data in all of said dimensions with a filter having an at least two-dimensional filter kernel, with a filter width in each of said at least two dimensions being constant.

31. A computer-readable medium encoded with a data structure as claimed in claim 29 which causes said processor to define respective adaptation factors for said unfiltered raw projection data and said filtered raw projection data dependent on said subset, and to fix said respective quantitative relationships dependent on the respective adaptation factors.

32. A computer-readable medium encoded with a data structure as claimed in claim 31 which causes said processor to set the adaptation factor for the unfiltered raw projection data or the adaptation factor for the filtered raw projection data equal to one.

33. A computer-readable medium encoded with a data structure as claimed in claim 31 which causes said processor to define a threshold for said unfiltered raw projection data, and setting at least one of said respective adaptation factors dependent on a difference between said unfiltered raw projection data and said threshold.

34. A computer-readable medium encoded with a data structure as claimed in claim 33 which causes said processor to set the respective adaptation factor for said unfiltered raw projection data equal to one, and setting the respective adaptation factor for the filtered raw projection data equal to zero when said difference between said unfiltered raw projection data and said threshold is less than or equal to zero.

35. A computer-readable medium encoded with a data structure as claimed in claim 34 which causes said processor to set the respective adaptation filter for said filtered raw projection data dependent on said difference between said unfiltered raw projection and said threshold and to set the adaptation factor for the unfiltered raw projection data as a difference between one and said adaptation factor for the filtered raw projection data, when said difference between said unfiltered raw projection data and said threshold is greater than zero.

36. A computer-readable medium encoded with a data structure as claimed in claim 31 wherein said acquired raw projection data have three dimensions, and wherein said data structure causes said processor to filter said projection data with a filter having a form $S_{af}(l, k, m)=g(S) \cdot S_f(l, k, m)+h(S) \cdot S(l, k, m),$ wherein l, k, m denote the dimensions of the acquired raw projection data, S(l, k, m) denotes the unfiltered three-dimensional raw projection data, g(S), h(S) denotes adaptation factors dependent on the respective raw projection data to be filtered, $S_f(l, k, m)$ denotes the raw projection data filtered with a filter having three-dimensional filter kernel, and $S_{af}(l, k, m)$ denotes the adaptively filtered raw projection data as output quantity of the filter.

37. A computer-readable medium encoded with a data structure as claimed in claim 36 which causes said processor to set said adaptation factor so that a signal noise of a signal voltage of said filtered raw projection data $S_{af}(l,k,m)$ remains constant independently of said unfiltered raw projection data S(l,k,m).

38. A computer-readable medium encoded with a data structure as claimed in claim 36 wherein said raw projection data filtered with said filter having said three-dimensional filter kernel have a form $$S_f(l, k, m) = \sum_{k',m'} G_{l',k',m'} \cdot S_{l-l',k-k',m-m'},$$

wherein $G_{l',k',m'}$ denotes the filter kernel and $S_{l-l',k-k',m-m'}$ references the unfiltered raw projection data.

39. A computer-readable medium encoded with a data structure as claimed in claim 31 wherein said acquired raw projection data have three dimensions, and wherein said data structure causes said processor to define a threshold for said unfiltered raw projection data, to define an adaptation factor dependent on a difference between the unfiltered raw projection data and said threshold, and to filter said three-dimensional raw projection data in a filter having a three-dimensional filter kernel with a form $S_{af}(l, k, m)=S(l, k, m)$ for $S(l, k, m)-SW \leq 0$ and $$S_{af}(l, k, m) = A(S-SW) \cdot S_f(l, k, m) + (1 - A(S-SW)) \cdot S(l, k, m) \text{ for } S(l, k, m) - SW > 0$$

wherein
- l, k, m denote the dimensions of the acquired raw projection data,
- S(l, k, m) denotes the unfiltered three-dimensional raw projection data,
- SW denotes an adjustable threshold,
- A(S−SW) denotes said adaptation factor,
- $S_f$(l, k, m) denotes the raw projection data filtered with said filter having a three-dimensional filter kernel, and $S_{af}$(l, k, m) denotes the adaptively filtered raw projection data as an output quantity of the filter.

40. A computer-readable medium encoded with a data structure as claimed in claim 39 which causes said processor to set said adaptation factor so that a signal noise of a signal voltage of said filtered raw projection data $S_{af}$(l,k,m) remains constant independently of said unfiltered raw projection data S(l,k,m).

41. A computer-readable medium encoded with a data structure as claimed in claim 39 wherein said projection data filtered with said raw filter having said three-dimensional filter kernel have a form $$S_f(l, k, m) = \sum_{k', m'} G_{l', k', m'} \cdot S_{l-l', k-k', m-m'},$$

wherein $G_{l',k',m'}$ denotes the filter kernel and $S_{l-l',k-k',m-m'}$ references the unfiltered raw projection data.

42. A computer-readable medium encoded with a data structure as claimed in claim 29 which causes said processor to operate on attenuation values obtained in a computed tomography apparatus as said acquired raw projection data.

43. A method as claimed in claim 1 comprising electronically reconstructing an image in a computer from said adaptively filtered projection data.

44. An apparatus as claimed in claim 15 comprising an image reconstruction computer connected to said output of said mixer, said image reconstruction computer reconstructing an image from said adaptively filtered projection data.

45. A computer readable medium encoded with a data structure as claimed in claim 29, wherein said data structure causes said processor to reconstruct an image from said adaptively filtered projection data.

* * * * *